(12) United States Patent
Kroll et al.

(10) Patent No.: US 7,137,417 B2
(45) Date of Patent: Nov. 21, 2006

(54) TIRE INFLATION TECHNOLOGY

(75) Inventors: William P. Kroll, Medina, MN (US); Randie Evenson, Brooklyn Center, MN (US)

(73) Assignee: Intercomp Company, Minneapolis, MN (US)

( * ) Notice: Subject to any disclaimer, the term of this patent is extended or adjusted under 35 U.S.C. 154(b) by 12 days.

(21) Appl. No.: 10/725,900

(22) Filed: Dec. 1, 2003

(65) Prior Publication Data

US 2005/0115633 A1    Jun. 2, 2005

(51) Int. Cl.
*B65B 31/04* (2006.01)

(52) U.S. Cl. ............................. 141/66; 141/38; 141/59; 141/65; 141/7; 141/8

(58) Field of Classification Search .................... 141/7, 141/8, 38, 59, 61, 65, 66, 98
See application file for complete search history.

(56) References Cited

U.S. PATENT DOCUMENTS 4,968,329 A * 11/1990 Keefer ........................... 95/98
4,971,609 A * 11/1990 Pawlos ......................... 96/128
6,120,383 A *  9/2000 Brown ......................... 473/135

* cited by examiner

*Primary Examiner*—Khoa D. Huynh
(74) *Attorney, Agent, or Firm*—Skinner and Associates

(57) ABSTRACT

An apparatus for purging an article such as a tire of moisture and other impurities and for inflating the article with dry pure gas. The apparatus includes a four way valve; a gas input assembly communicatively connected to the valve; a vacuum generator communicatively connected to the valve; and an article interface assembly communicatively connected to the valve. A method of purging and inflating an article, includes the steps of establishing fluid communication between an article and a valve; establishing a pressurized fluid communication between the valve and a source of pressurized gas; establishing a fluid connection between the valve and a vacuum generator whereby pressurized gas flows through the vacuum generator to the atmosphere and fluid in the article flows through the vacuum generator to the atmosphere; and establishing a fluid connection via the valve whereby pressurized gas flows to the article.

21 Claims, 11 Drawing Sheets

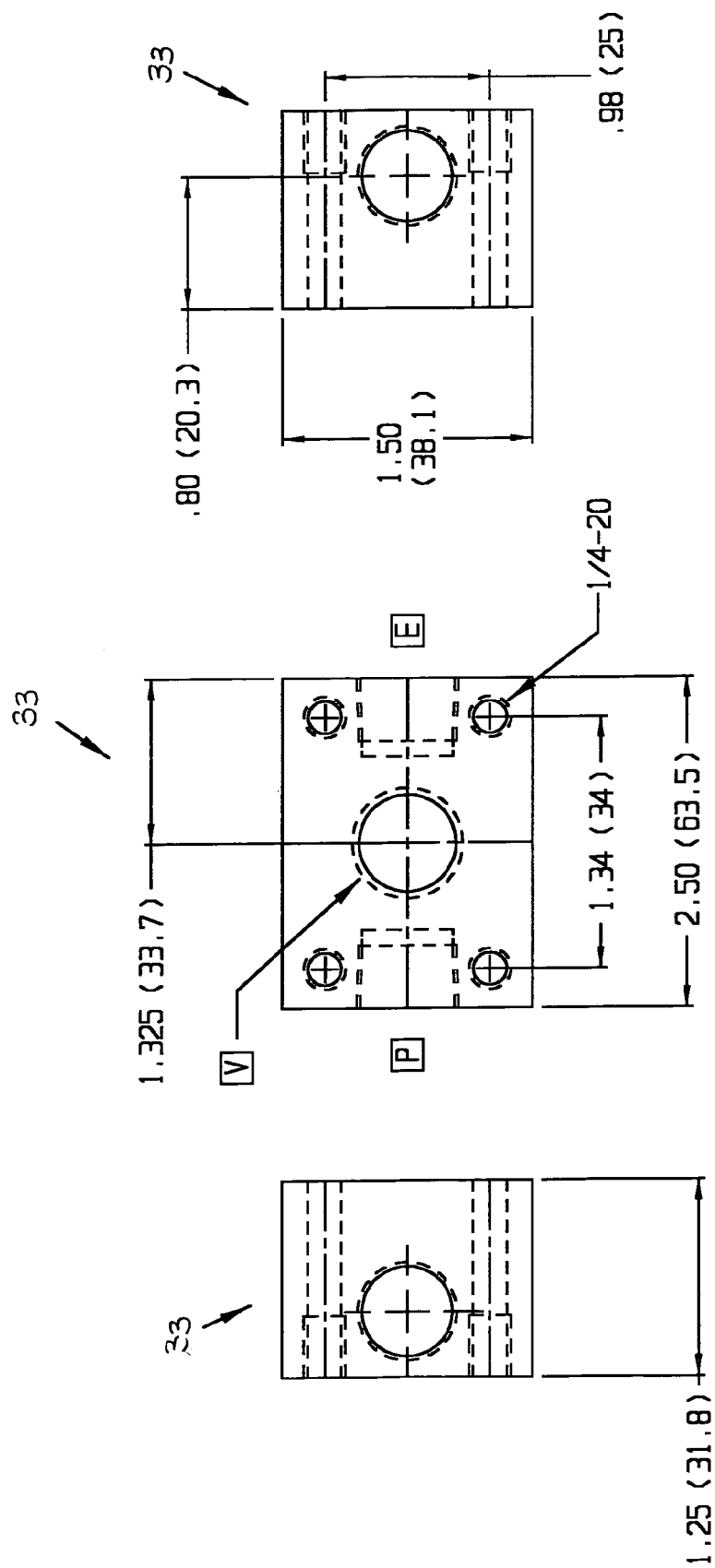

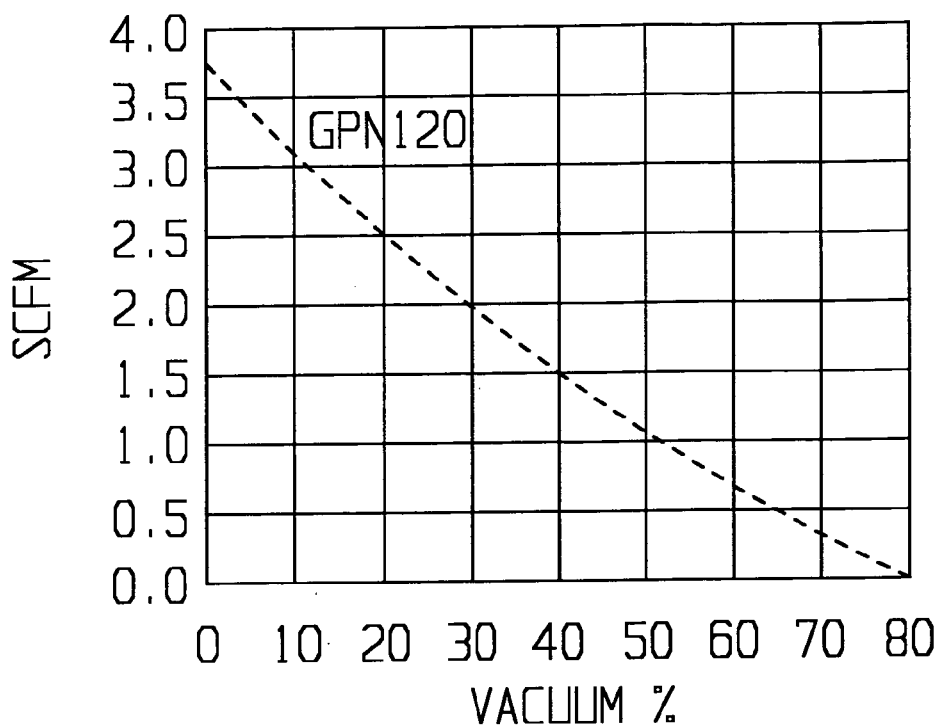
FIG. 15
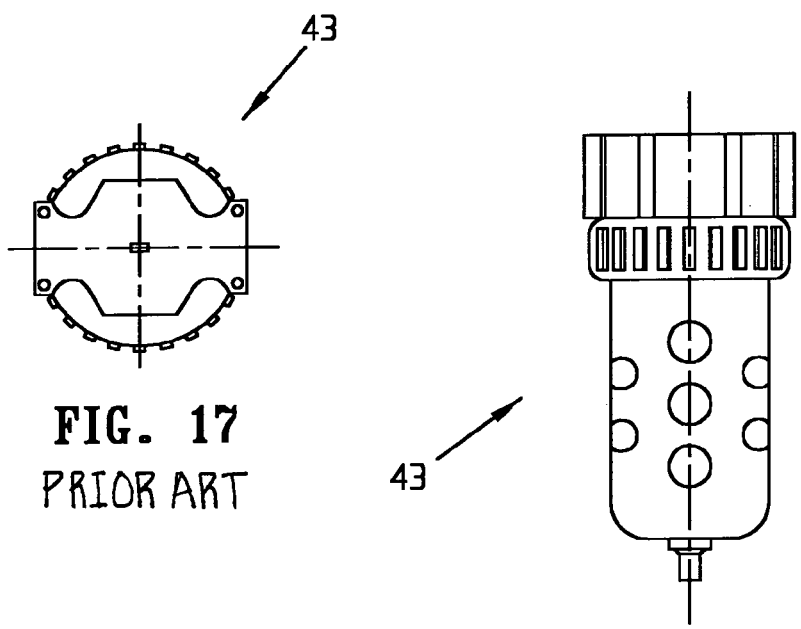
FIG. 17
PRIOR ART
FIG. 16
PRIOR ART

TIRE INFLATION TECHNOLOGY

37 C.F.R. §1.71(e) AUTHORIZATION

A portion of the disclosure of this patent document contains material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

CROSS-REFERENCE TO RELATED APPLICATIONS, IF ANY

Not applicable.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND

1. Field

The present invention relates, generally, to article inflation and purging apparatus and methods. More particularly, the invention relates to tire inflation and purging apparatus and methods. Most particularly, the invention relates to a system, apparatus and method for purging tires of specialty and high performance vehicle tires of moisture and impurities and for inflating such tires with clean dry air or gas. The invention is especially suitable for high performance racing automobile tires. The techniques of the invention can also be used in other fields wherein inflation or pressurization of articles, particularly inflatable articles, is required, such as but not limited to, aviation, aeronautics, military technology and the like.

2. Background Information

Existing technology, in general, includes various apparatus and/or methods for inflating pneumatic articles such as tires. In the past, tires of cars, trucks, industrial or agricultural machinery, tractors, buses, carts, aircraft, motorcycles, scooters, bicycles and the like have been inflated with compressed air. Common means of inflation include fixed and portable compressors, small pumps, hand pumps and the like. These means are satisfactory for most tire applications. However, specialized tires on specialty vehicles such as high performance racing automobiles and aircraft for example, have specialized inflation needs for which traditional means are unsatisfactory. In particular, compressed ambient air typically contains moisture and potentially other impurities which negatively effects the performance of racing tires running at high speeds and high temperatures. Also, moisture and impurities may also effect performance of aircraft tires which are subject to extremes of both high and low temperature.

U.S. Pat. No. 5,967,198 issued to Smalley on Oct. 19, 1999 for a tire evacuation and inflation apparatus and method. Smalley discloses an apparatus and method for evacuating a tire of moisture via a vacuum pump and for inflating the tire with relatively expensive Nitrogen gas. The apparatus and method of Smalley require a three way ball valve.

The above described background technology is believed to have significant limitations and shortcomings in terms of providing an optimum combination of functionality, reliability, and speed and ease of use. Thus, a need exists for the present invention.

All US patents and patent applications, and all other published documents mentioned anywhere in this application are hereby incorporated by reference in their entirety.

BRIEF SUMMARY

The present invention provides an article purging and inflation apparatus and method which is practical, reliable, accurate and efficient, and which is believed to fulfil a need and to constitute an improvement over the background technology.

In one aspect, the invention provides an article purging and inflation apparatus, comprising a four way valve; a gas input assembly communicatively connected to the valve; a vacuum generator communicatively connected to the valve; and an article interface assembly communicatively connected to the valve.

In another aspect, the invention provides a method of purging and inflating an article, comprising the steps of:
 (a) establishing fluid communication between an article and a valve;
 (b) establishing a pressurized fluid communication between the valve and a source of pressurized gas;
 (c) establishing a fluid connection between the valve and a vacuum generator whereby pressurized gas flows through the vacuum generator to the atmosphere and fluid in the article flows through the vacuum generator to the atmosphere; and
 (d) establishing a fluid connection via the valve whereby pressurized gas flows to the article.

The features, advantages, benefits, aspects and objects of the invention will become clear to those skilled in the art by reference to the following description, claims and drawings.

BRIEF DESCRIPTION OF THE SEVERAL VIEWS OF THE DRAWING

The present invention, and the manner and process of making and using it, will be better understood by those skilled in the art by reference to the following drawings.

FIG. 12 is a side view of the vacuum generator.

FIG. 13 is a front view of the vacuum generator.

FIG. 14 is an opposite side view of the vacuum (generator.

FIG. 15 is a graph of the performance characteristics of the vacuum generator.

FIG. 16 is a front view of an embodiment of the filter used in an embodiment of the apparatus.

FIG. 17 is a top view of the filter.

DETAILED DESCRIPTION

Figure 1:
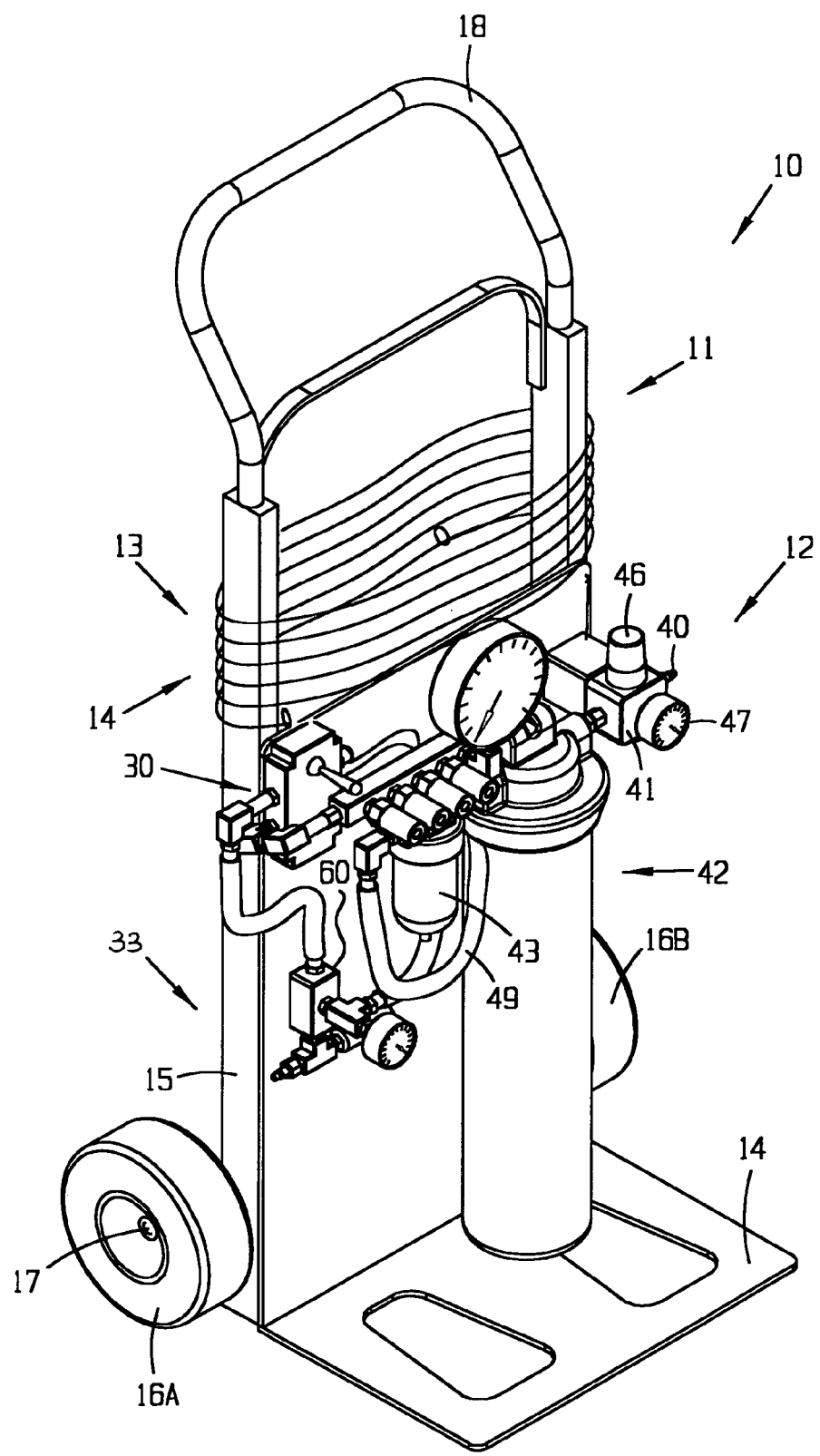
FIG. 1 is a perspective view of an embodiment of the article purging and inflation apparatus and method of the invention.
Figure 2:
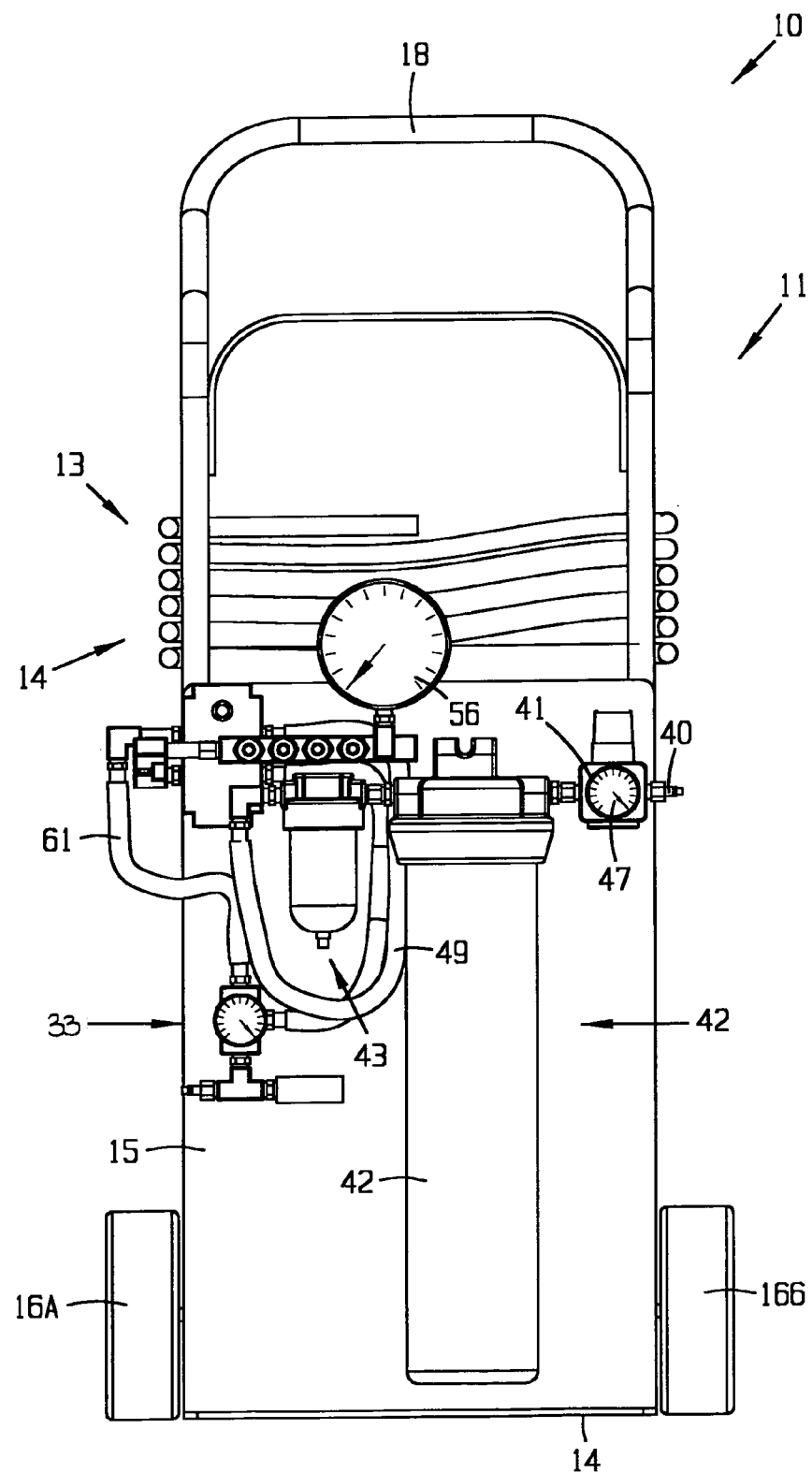
FIG. 2 is a front elevation view of the article purging and inflation apparatus shown in FIG. 1.
Figure 3:
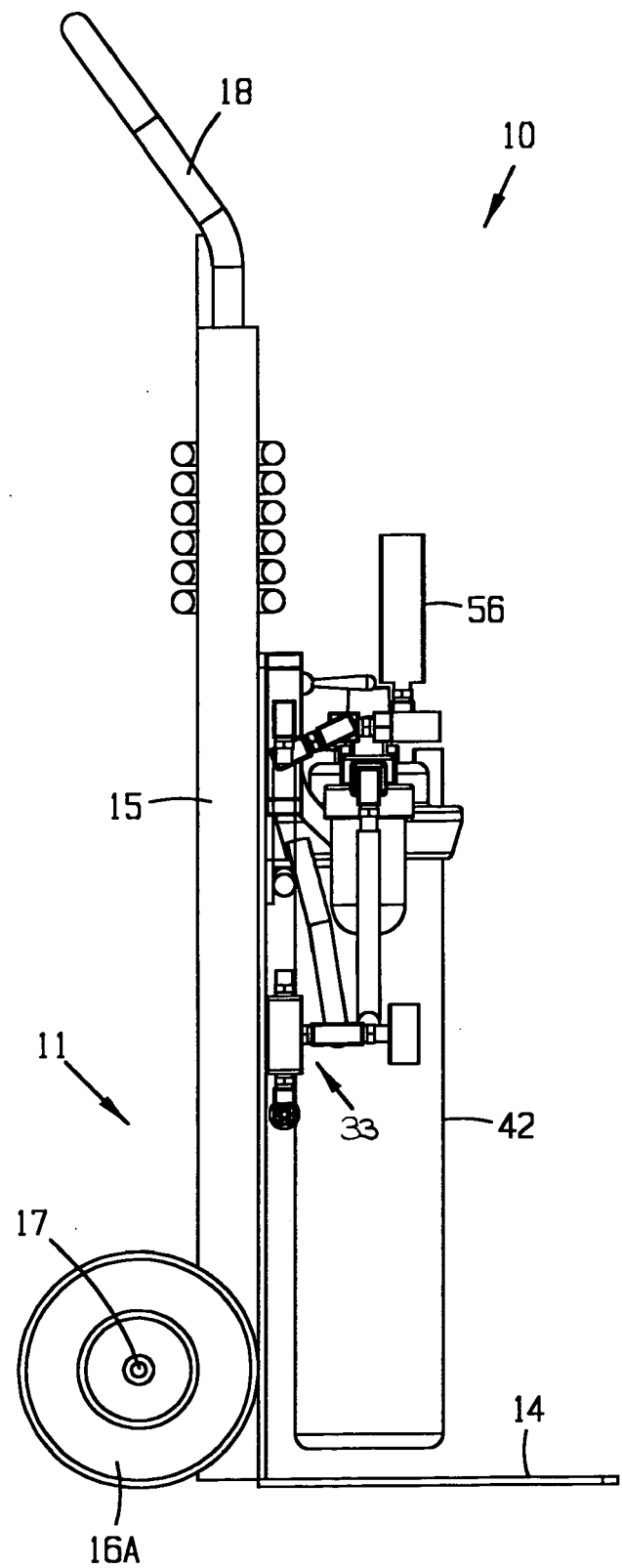
FIG. 3 is a side elevation view of the article purging and inflation apparatus.
Figure 4:
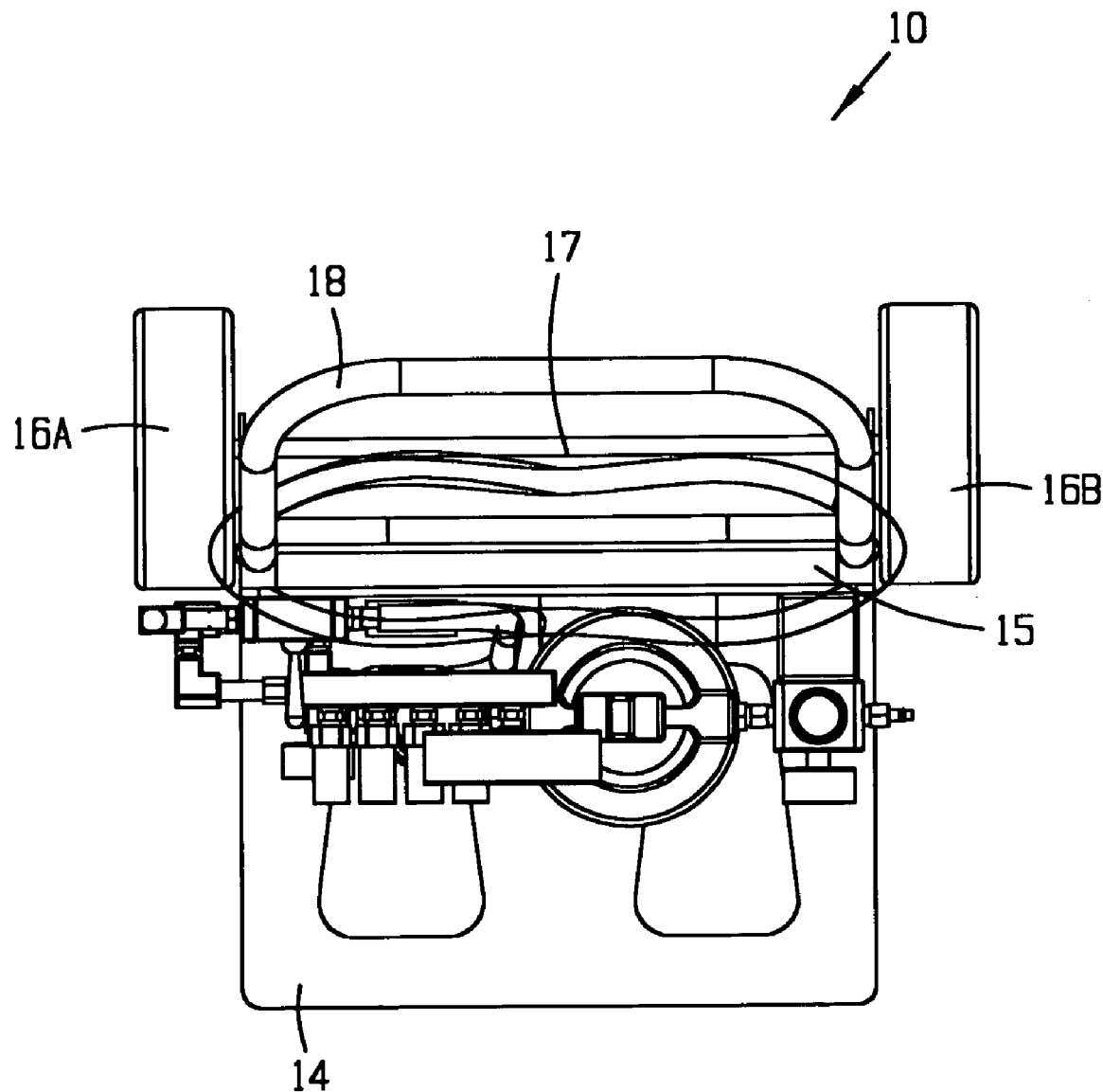
FIG. 4 is a top view of the article purging and inflation apparatus
Figure 5:
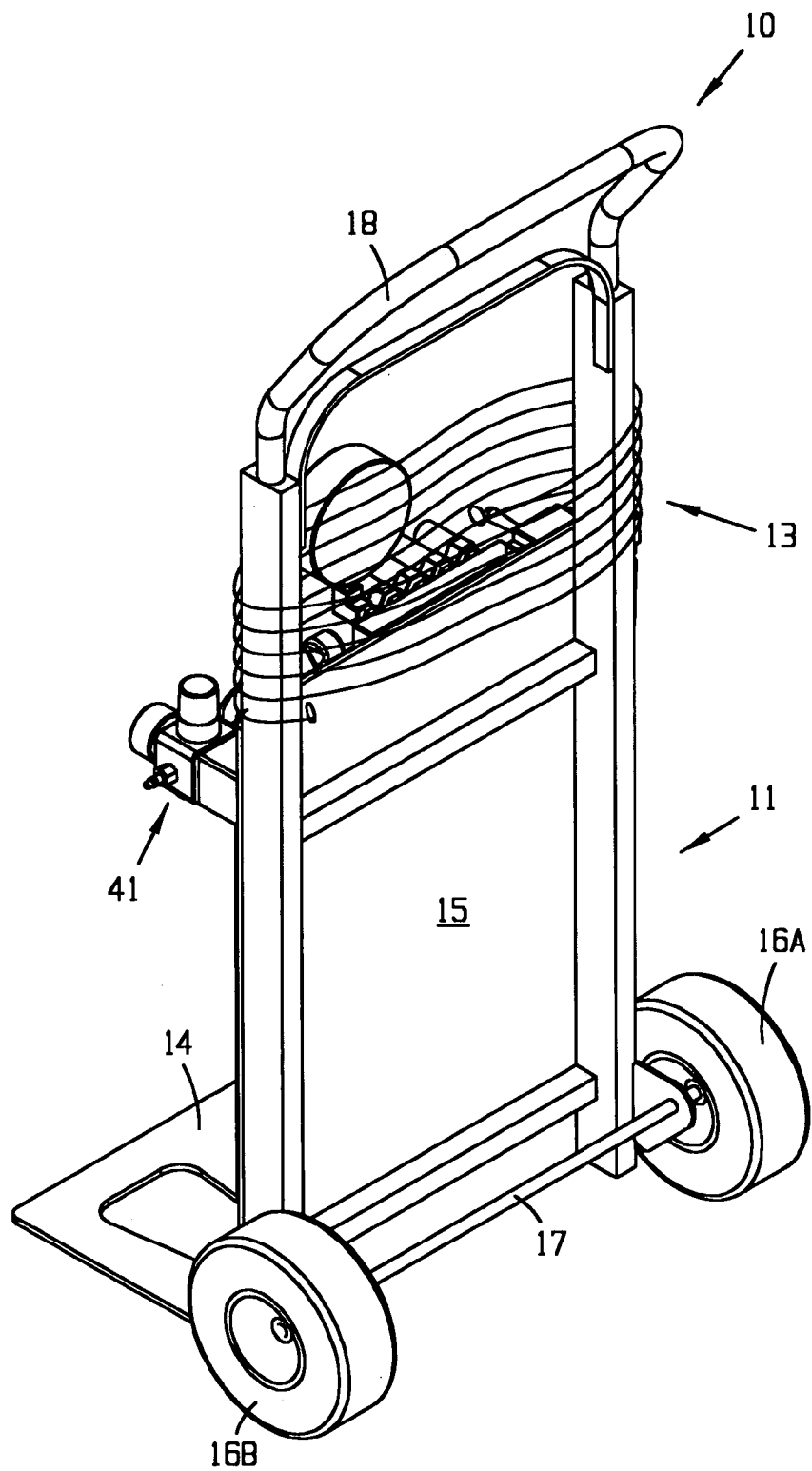
FIG. 5 is a perspective view of the back side of the article purging and inflation apparatus.

The drawing Figures, show an embodiment of the tire purging and inflation apparatus of the present invention, generally indicated by the reference numeral 10. The embodiments of the invention described is intended to be illustrative and not to be exhaustive or limit the invention to the exact forms disclosed. The embodiments are chosen and described so that person's skilled in the art will be able to understand the invention and the manner and process of making and using it.

The article purging and inflation apparatus 10 and method is compact for easy storage and transport. The apparatus 10 is useable to purge or evacuate four (4) articles preferably inflatable articles such as tires, simultaneously, and to fill such tires with dry air or a gas. Inflation capabilities range from near 0 to 100 pounds per square inch (PSI).

Referring to FIGS. 1–5, the tire purging and inflation apparatus 10 basically comprises a cart 11, a purging and inflation mechanism 12 and a plurality of tire hoses 13a–b, preferably four (4). The cart 11 preferably has a bottom base 14, a back 15 extending from the base 14, a pair of wheels 16 disposed at the intersection of the base 14 and the back 15 mounted on a common shaft 17, and a handle 18 extending from the back 15. The two wheel, upright cart 11 design provides a means of quickly and efficiently transporting the purging and inflation mechanism 12 and the hoses 13 as a combined group for performing tire purging and inflation work at a variety of locations. The cart 11 also provides a means of storing the mechanism 12 and hoses 13 in a compact fashion. The structure of the cart 11 may be varied to accomplish substantially similar functions, for example by way of a four wheel cart.

Figure 6:
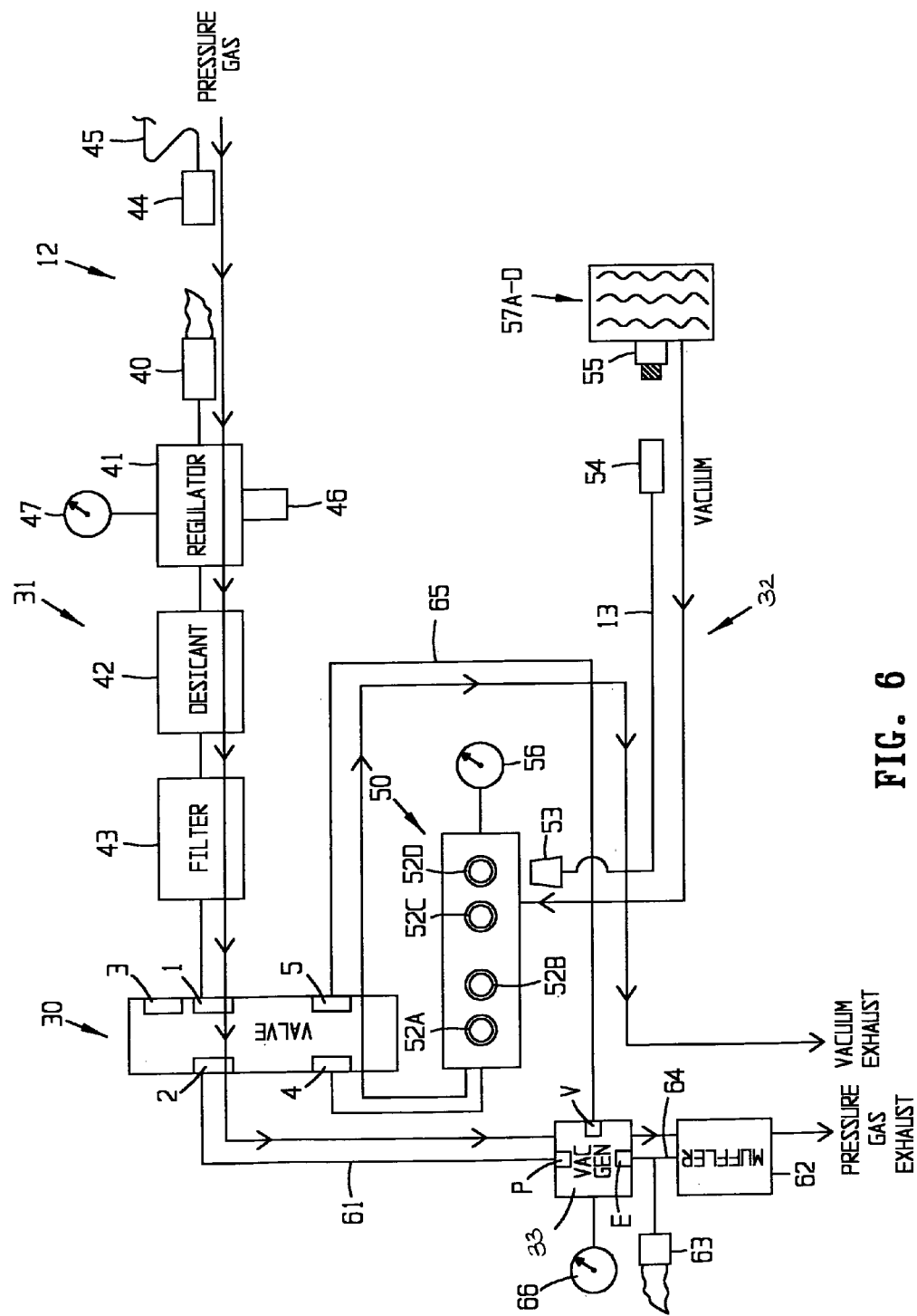
FIG. 6 is a schematic illustration of the embodiment of the article purging and inflation apparatus showing a purging mode.
Figure 7:
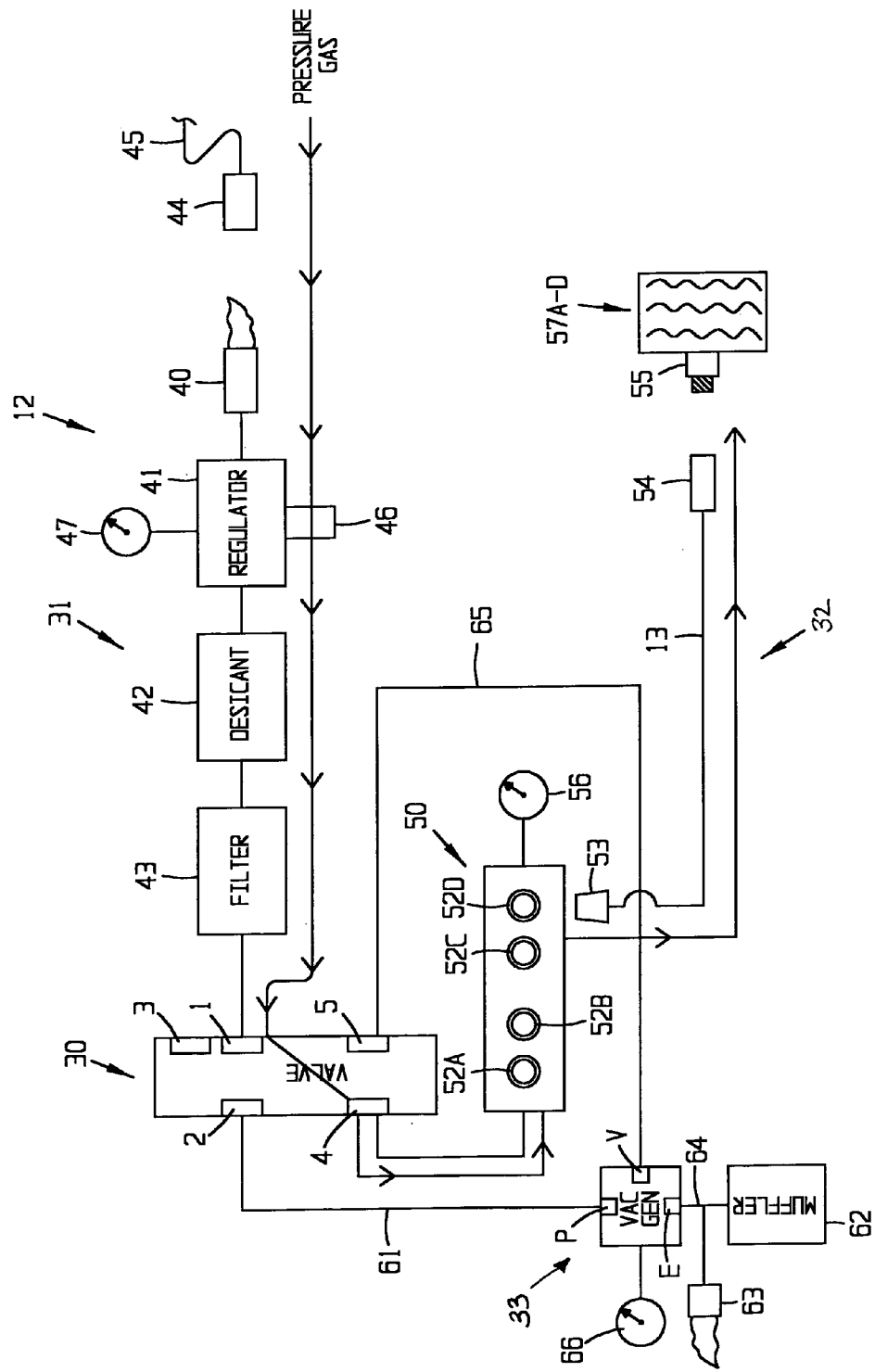
FIG. 7 is a schematic illustration of the embodiment of the article purging and inflation apparatus showing an inflation mode.

Referring also to FIGS. 6 and 7, the purging and inflation mechanism 12 basically comprises a valve 30, an air input assembly 31, a tire interface assembly 32, and a vacuum generator 33. The valve 30 functions to control the inflation mechanism 12 and provide a purging mode and an inflation mode. The air input assembly 31 is communicatively connected to the valve 30 and provides a source of gas such as compressed air, Nitrogen gas, Argon gas, coolant type gasses, or the like to the mechanism 12 via the valve 30. The later gases are relatively expensive. The mechanism is optimized for use of less expensive compressed air. In the preferred embodiment, the air input assembly 31 is adapted to be connected to an external source of gas, compressed air in particular. The tire interface assembly is communicatively connected to the valve 30 and functions to connect the mechanism 12, via the valve 30 to one or more tires or other articles which are to be purged of gases and impurities and/or inflated with pure gases. The vacuum generator 33 is communicatively connected to the valve 30 and functions to provide a vacuum source with which to purge or evacuate the tires or other articles of gasses and impurities.

Figure 8:
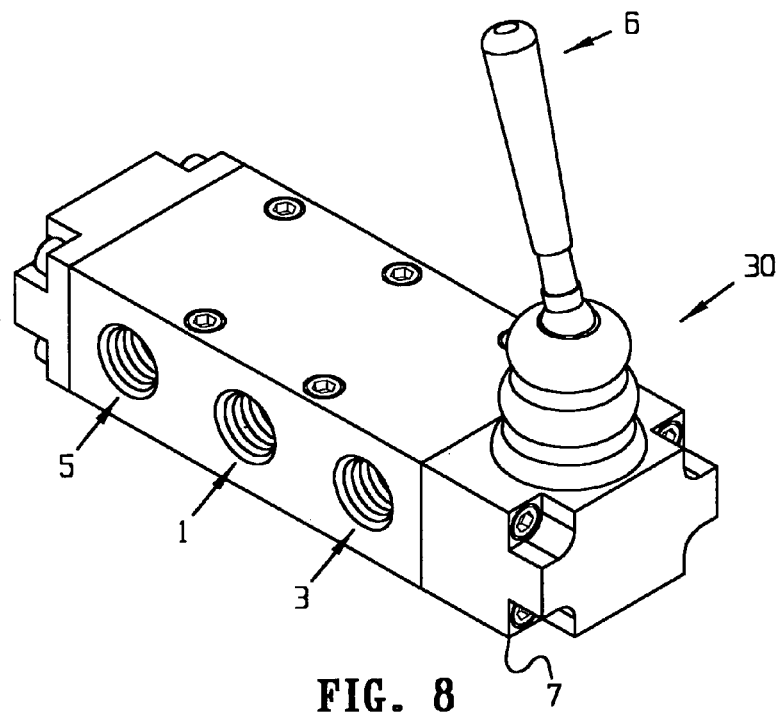
FIG. 8 shows an embodiment of the 4 way valve used in an embodiment of the article purging and inflation apparatus.
Figure 9:
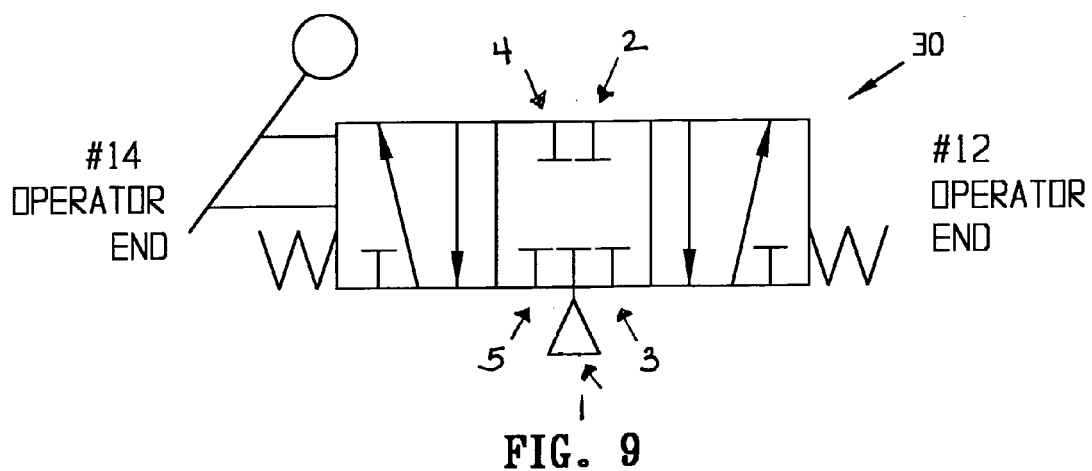
FIG. 9 is a schematic diagram of the valve.
Figure 10:
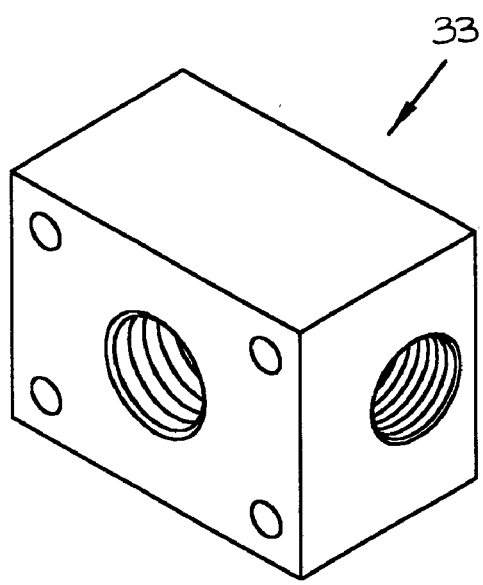
FIG. 10 shows an embodiment of the vacuum generator used in an embodiment of the apparatus.
Figure 11:
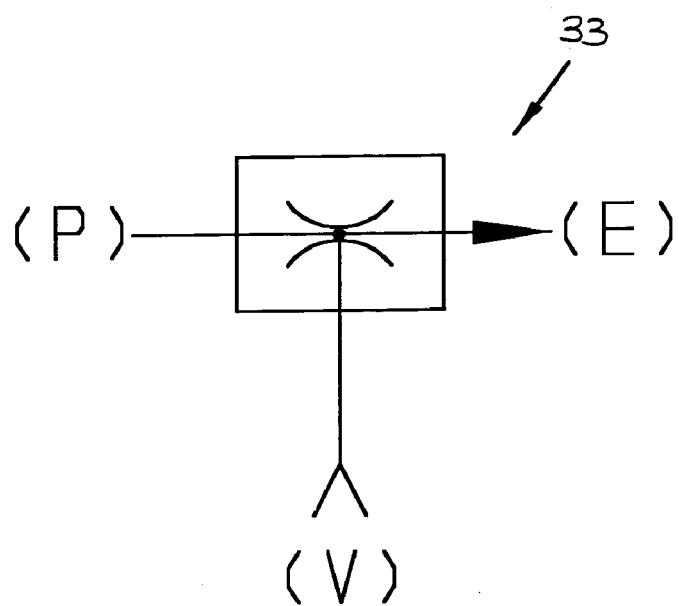
FIG. 11 is a schematic diagram of the vacuum generator.

Referring also to FIGS. 8 and 9, the valve 30 is a four way ball or spool valve. Preferably, the four way valve 30 is a lever operated, 3-position, lever spring centered valve. An example of such a valve is the Model 52181 1000 DIRECTAIR 4 Series Inline Valve Type 1, Closed Center valve manufactured by Parker Hannifin Corporation of Richland, Mich. USA. The valve 30 operates at pressures from Vacuum to 150 PSI at 32 to 175 F. As lever 6 is pulled (away from body 7), pressure at inlet port 1 is connected to outlet port 4. Outlet port 2 is connected to exhaust port 3. As the lever is pushed (toward body), pressure at inlet port 1 is connected to outlet port 2. Outlet Port 4 is connected to exhaust port 5. When the lever 6 is in a centered position, all ports are blocked.

Referring again to FIGS. 6 and 7, the air input assembly 31 preferably comprises an inlet port 40, a regulator 41, an air dryer and a filter 43. The inlet port 40 is preferably a standard female type air hose coupling connector adapted for connection to a standard male type air hose coupling connector 44 of a hose 45 communicatively connected to a gas source such as compressed air or Nitrogen (not shown). The regulator 41 is connected to the inlet port 40 and is preferably and adjustable element for providing inlet gas at a predetermined pressure and has an adjuster 46 and a pressure indicator gauge 47. The air dryer 42 is connected to the regulator 41 and is preferably a desiccant canister system. The desiccant cartridge is replaceable. Alternatively, the cartridge can be opened and the desiccant can be removed, dried and reused. Recycling is accomplished by pouring the desiccant on a metal sheet and placing the sheet in an oven at about 350 F for about one hour. The filter 43 is connected to the desiccant canister 42 and is preferably a sediment type filter. Referring also to FIGS. 16 and 17, an example filter 43 is a Model 06F21AC PREP-AIR II 06F Series Compact Filter provided by Parker Hannifin Corporation. The filter has a ⅜ inch port, a twist drain bowl, and an approximately 40 Micron filter element. The filter 43 is connected to inlet port 1 of the valve 30. The connections between these elements are preferably direct or indirect hard connections, with the exception of the connection between the filter 43 and the valve 30, which is made via a connection hose 49. The filter 43 primarily traps any desiccant which may escape the dryer 42, but also aids in capturing moisture and impurities, such as oil, rust and the like, in input gases.

The tire interface assembly 32 comprises a manifold 50 connected to the valve 30 at outlet port 4. Connection is shown as a hard connection. The manifold has a plurality, preferably 4, of standard female type air coupling fittings 52a–d which mate with standard male type fittings 53 on hoses 13a–d. This permits simultaneous purging and/or inflation of the four tires of a standard vehicle. Hoses 13 have standard tire chuck connectors 54 at their distal ends for connection to a valve stem 55 of a tire 57. A tire pressure indicator gauge 56 is preferably connected to the manifold so that input tire pressure may be monitored from a single point.

Referring also to FIGS. 10–14, the vacuum generator 33 is a venturi type generator which does not require a pump. An example vacuum generator 33 is a Model P5V-GPN vacuum generator provided by Parker Hannifin Corporation of Wadsworth, Ohio USA. The vacuum generator 33 is compact and lightweight for mounting on the cart 11. Referring to FIG. 15, it consumes minimal air (approximately 120 L/min) and generates high vacuum levels. The vacuum generator 33 has pressure port (P), exhaust port (E) and venturi port (V). Pressure port P is communicatively connected to valve 30 output port 2, preferably via hose 61. Venturi port V is communicatively connected to port 5 of valve 30, preferably via line 65. Exhaust port E is connected to an exhaust muffler 62. A fitting 63 is preferably connected in line 63 connecting the exhaust port E with muffler 62. An indicator gauge 66 is preferably connected to the vacuum venerator 33.

In use, the apparatus 10 has two modes, a purging mode and an inflation mode. Referring to FIG. 6, one or more tires 57 are purged by connecting fitting 53 at a proximal end of each hose 13 to fitting 52 of manifold, and by connecting chuck 54 at a distal end of each hose 13 to a valve stem 55 of each subject tire 57. Tire 57 is pre-seated on a wheel, with or without a tube or other internal bladder. Preferably, the tire 57 is deflated and contains only ambient air at normal atmospheric pressure. Gas inlet line 45 connected to a source of pressurized gas such as compressed air or Nitrogen (not shown) is connected to inlet fitting 40 and pressurized gas is introduced. Gas pressure is controlled by actuating controller 46 on regulator 41 and visualizing pressure on gauge 47. Gas flows from regulator 41 to dryer 42 where moisture is removed. Gas flows from dryer 42 to filter 43 for filtering. Gas flows from filter 43 to valve 30. Valve 30 controller 6 is actuated to permit gas to from inlet port 1 to outlet port 2. Gas flows from the valve 30 to port P of vacuum generator 33, and exits at port E to muffler 62 and then to the atmosphere. This creates a vacuum at port V. Actuation of controller 6 of valve 30 also connects port 5 to port 4. Since port 4 is connected to manifold 50, the vacuum at port V of the vacuum generator 33 is applied to the manifold 50 via coupling line 65. The vacuum condition of the manifold 50 is applied to each subject tire 57 via an interconnecting hose 13.

Referring to FIG. 7, one or more tires 57 are inflated by preserving the existing connections between the fitting 53 at the proximal end of each hose 13 to fitting 52 of manifold, and the chuck 54 at the distal end of each hose 13 to the valve stem 55 of each subject tire 57 made for the purging cycle described above. Also preserved is the connection between the gas inlet line 45 to the source of pressurized gas. It is not required that any of the above connections be removed or changed with respect to a prior purging procedure. Gas pressure is still controlled by actuating controller 46 on regulator 41 and visualizing pressure on gauge 47. Gas passes through the regulator 41, dryer 42 and filter 43 to the valve 30. Valve 30 controller 6 is simply actuated to permit gas to from inlet port 1 to outlet port 4. Gas flows from the valve 30 to manifold 50 and from there to each subject tire 57 via an interconnecting hose 13.

Although the apparatus and method has been described in connection with the field of vehicle tire inflation, it can readily be appreciated that it is not limited solely to such field. The apparatus and method of the invention can be adapted to purge and/or fill various types of articles, particularly inflatable, pneumatic or other flexible or elastomeric articles.

The descriptions above and the accompanying drawings should be interpreted in the illustrative and not the limited sense. While the invention has been disclosed in connection with an embodiment or embodiments thereof, it should be understood by those skilled in the art that there may be other embodiments which fall within the scope of the invention as defined by the claims. Where a claim, if any, is expressed as a means or step for performing a specified function it is intended that such claim be construed to cover the corresponding structure, material, or acts described in the specification and equivalents thereof, including both structural equivalents and equivalent structures, material-based equivalents and equivalent materials, and act-based equivalents and equivalent acts.

What is claimed is:

1. An article purging and inflating apparatus comprising: a four way valve; a gas input assembly communicatively connected to the valve; a vacuum generator communicatively connected to the valve via a pressure inlet port and a venturi port, the vacuum generator further having an exhaust port connected to the atmosphere; an article interface assembly communicatively connected to the valve; wherein the four way valve has an inlet port, two outlet ports, and two exhaust ports.

2. The article purging and inflating apparatus of claim 1 wherein the apparatus is for purging a tire of gases and moisture and for inflating the tire with dry gases.

3. The article purging and inflating apparatus of claim 1, wherein the gas input assembly is communicatively connected to the inlet port, the article interface assembly is communicatively connected to one of said outlet ports, and the vacuum generator is communicatively connected to the other port of said outlet ports and to one of said exhaust port.

4. The article purging and inflating apparatus of claim 1, wherein the gas inlet assembly is adapted for connection to a source of pressurized gas, the pressurized gas being selected from the group of gases consisting of pressurized air, Nitrogen, Argon, and Sodium Hexaflouride.

5. The article purging and inflating apparatus of claim 4, wherein the gas inlet assembly includes an inlet connector adapted for connection to the source of the pressurized gas and a gas dryer disposed between the inlet connector and the valve.

6. The article purging and inflating apparatus of claim 5, wherein the gas dryer is a desiccant cartridge type dryer.

7. The article purging and inflating apparatus of claim 5, wherein the gas inlet assembly further includes a pressure regulator disposed between the inlet connector and the gas dryer.

8. The article purging and inflating apparatus of claim 7, wherein the gas inlet assembly further includes a pressure indicator communicatively connected to the pressure regulator.

9. The article purging and inflating apparatus of claim 5, wherein the gas inlet assembly further includes a filter disposed between the gas dryer and the valve.

10. The article purging and inflating apparatus of claim 5, wherein the gas inlet assembly further comprises a pressure regulator disposed between the inlet connector and the gas dryer, a pressure indicator communicatively connected to the pressure regulator, and a filter disposed between the gas dryer and the valve.

11. The article purging and inflating apparatus of claim 1, wherein the vacuum generator is a venturi type device.

12. The article purging and inflating apparatus of claim 1, further comprising a muffler communicatively connected to the vacuum generator.

13. The article purging and inflating apparatus of claim 1, further comprising a vacuum indicator gauge communicatively connected to the vacuum generator.

14. The article purging and inflating apparatus of claim 1, wherein the article interface assembly comprises a manifold connected to the valve, the manifold having a plurality of connectors, each being adapted to connect to at least one connection hose for connection to a tire.

15. The article purging and inflating apparatus of claim 14, wherein the article interface assembly further comprises a pressure indicator communicatively connected to the manifold.

16. The article purging apparatus of claim 1, wherein the article interface assembly is adapted for connection to an article, whereby the valve is actuatable to selectively communicatively connect the vacuum generator to the article interface assembly to purge the article of gas and to selectively communicatively connect the gas input assembly to the article interface assembly to inflate the article with gas.

17. A tire purging and inflating apparatus for removing moisture from at least four tires and inflating the tires with dry gas, comprising:
  (a) a four way valve, the valve having an inlet port, two outlet ports and two exhaust ports;
  (b) a gas input assembly communicatively connected to the inlet port of the valve, the gas input assembly including:
    (i) an inlet connector adapted for connection to the source of pressurized gas,
    (ii) a desiccant canister gas dryer disposed between the inlet connector and the valve, and
    (iii) a pressure regulator disposed between the inlet connector and the gas dryer;
  (c) a venturi type pressurized gas vacuum generator communicatively connected to the valve, the vacuum generator having a pressure port connected to an outlet port of the valve, an exhaust port connected to the atmosphere, and a venturi port connected to an exhaust port of the valve; and
  (d) an article interface assembly communicatively connected to the valve, the article interface assembly including a manifold connected to an outlet port of the valve, the manifold having at least three connectors each being adapted to connect to at least one connection hose for connection to a tire.

18. A method of purging and inflating an article, comprising the steps of:
  (a) establishing fluid communication between an article and a valve;
  (b) establishing a pressurized fluid communication between the valve and a source of pressurized gas; (c) actuating the valve to establish a fluid connection between the valve and a vacuum generator whereby pressurized gas flows from the source of pressurized gas through the valve to a gas inlet port of the vacuum generator and then through an exhaust port of the vacuum generator to the atmosphere and simultaneously fluid in the article flows through the valve to a venturi port of the vacuum generator and then to the atmosphere; and (d) actuating the valve to terminate the fluid connection between the valve and the vacuum generator and to permit pressurized gas flow to the article.

19. An article purging and inflating apparatus comprising: a four way valve; a gas input assembly communicatively connected to the valve; a vacuum generator communicatively connected to the valve via a pressure inlet port and a venturi port, the vacuum generator further having an exhaust port connected to the atmosphere; an article interface assembly communicatively connected to the valve; wherein the gas inlet assembly is adapted for connection to a source of pressurized gas, the pressurized gas being selected from the group of gases consisting of pressurized air, Nitrogen, Argon, and Sodium Hexaflouride; and wherein the gas inlet assembly includes an inlet connector adapted for connection to the source of pressurized gas and a gas dryer disposed between the inlet connector and the valve.

20. An article purging and inflating apparatus comprising: a four way valve; a gas input assembly communicatively connected to the valve; a vacuum generator communicatively connected to the valve via a pressure inlet port and a venturi port, the vacuum generator further having an exhaust port connected to the atmosphere; an article interface assembly communicatively connected to the valve; wherein the article interface assembly comprises a manifold connected to the valve, the manifold having a plurality of connectors, each being adapted to connect to at least one connection hose for connection to a tire.

21. An article purging and inflating apparatus comprising: a four way valve; a gas input assembly communicatively connected to the valve; a vacuum generator communicatively connected to the valve via a pressure inlet port and a venturi port, the vacuum generator further having an exhaust port connected to the atmosphere; an article interface assembly communicatively connected to the valve; wherein the article interface assembly is adapted for connection to an article, whereby the valve is actuatable to selectively communicatively connect the vacuum generator to the article interface assembly to purge the article of gas and to selectively communicatively connect the gas input assembly to the article interface assembly to inflate the article with gas.

* * * * *